US012680617B2

(12) United States Patent (10) Patent No.: US 12,680,617 B2
Gemmill et al. (45) Date of Patent: Jul. 14, 2026

(54) COMPACT VALVE SYSTEM

(71) Applicant: VIRGIN GALACTIC HOLDINGS, INC., Tustin, CA (US)

(72) Inventors: Anthony Gemmill, San Marcos, CA (US); Chris Grainger, San Diego, CA (US); Luke Colby, Watertown, MA (US)

(73) Assignee: VIRGIN GALACTIC HOLDINGS, INC., Tustin, CA (US)

( * ) Notice: Subject to any disclaimer, the term of this patent is extended or adjusted under 35 U.S.C. 154(b) by 139 days.

(21) Appl. No.: 18/759,166

(22) Filed: Jun. 28, 2024

(65) Prior Publication Data

US 2026/0002598 A1     Jan. 1, 2026

(51) Int. Cl.
F16K 11/22          (2006.01)
F16K 27/02          (2006.01)
F16K 31/122         (2006.01)

(52) U.S. Cl.
CPC .......... F16K 11/22 (2013.01); F16K 27/0263 (2013.01); F16K 31/1221 (2013.01)

(58) Field of Classification Search
CPC ..................... F16K 11/22; F16K 11/20; F16K 11/27–0263; F16K 2200/20–204; F16K 2200/47–08; Y10T 137/86936; Y10T 137/86944
USPC .................................................. 137/629–630
See application file for complete search history.

(56) References Cited

U.S. PATENT DOCUMENTS

| | | | | |
|---|---|---|---|---|
| 3,249,124 A * | 5/1966 | Berryman | ............... | E21B 21/10 |
| | | | | 137/629 |
| 4,848,340 A * | 7/1989 | Bille | ...................... | A61B 3/113 |
| | | | | 606/4 |
| 5,333,644 A * | 8/1994 | Heyden | ................... | F16K 1/443 |
| | | | | 137/614.19 |
| 10,221,965 B2 * | 3/2019 | Wyatt | ..................... | F16K 47/08 |
| 10,823,295 B2 * | 11/2020 | Povey | ................. | F16K 31/1228 |
| 11,572,903 B2 * | 2/2023 | Yonezawa | ............... | F16K 11/22 |

* cited by examiner

*Primary Examiner* — Michael R Reid
(74) *Attorney, Agent, or Firm* — Sheppard, Mullin, Richter & Hampton LLP

(57)          ABSTRACT

The disclosed technology provides compact valve systems. A disclosed valve system may comprise: (1) a housing comprising apertures to permit a fluid connection between a chamber the housing is positioned within and a cavity of the housing; (2) a secondary valve positioned concentrically outside the housing; and (3) a primary valve comprising a valve seat positioned concentrically within the cavity. When the secondary valve is in a closed position the secondary valve may cover the apertures to block the fluid connection between the chamber and the cavity. When the primary valve is in a closed position and the secondary valve is in an open position, a first axial direction-facing surface of the valve seat may be positioned in a second axial direction from the apertures, thus blocking a fluid connection between the chamber and a fluid routing structure positioned in the second axial direction from the valve seat.

15 Claims, 5 Drawing Sheets

500

ACTUATING A FIRST VALVE OF A VALVE SYSTEM INTO AN OPEN POSITION, WHEREIN ACTUATING THE FIRST VALVE OF INTO THE OPEN POSITION PERMITS FLUID TO FLOW FROM A CHAMBER, THROUGH A FLUID ROUTING PASSAGE, AND INTO A CAVITY OF A HOUSING OF THE VALVE SYSTEM, WHEREIN THE HOUSING IS POSITIONED WITHIN THE CHAMBER 502

RESPONSIVE TO DETECTING PRESSURE WITHIN THE CAVITY IS WITHIN A THRESHOLD DIFFERENCE OF PRESSURE IN THE CHAMBER, ACTUATING A SECOND VALVE OF THE VALVE SYSTEM INTO AN OPEN POSITION, WHEREIN ACTUATING THE SECOND VALVE INTO THE OPEN POSITION PERMITS ADDITIONAL FLUID TO FLOW FROM THE CHAMBER, THROUGH ONE OR MORE APERTURES IN THE HOUSING, AND INTO THE CAVITY 504

RESPONSIVE TO DETECTING LESS THAN A THRESHOLD AMOUNT OF FLUID HAS FLOWED FROM THE CAVITY, PAST A THIRD VALVE OF THE VALVE SYSTEM, AND INTO A FLUID ROUTING STRUCTURE, ACTUATING THE THIRD VALVE INTO AN OPEN POSITION, WHEREIN ACTUATING THE THIRD VALVE INTO THE OPEN POSITION PERMITS FLUID TO FLOW FROM THE CHAMBER INTO FLUID ROUTING STRUCTURE 506

FIG. 5

COMPACT VALVE SYSTEM

TECHNICAL FIELD

The present disclosure relates generally to valves and valve systems. In particular, some implementations may relate to multi-valve systems incorporated into a shared housing.

DESCRIPTION OF RELATED ART

Certain machines may improve operational safety, machine life, or a combination of the two, through precise fluid flow control. For example, machines may implement processes which precisely control, e.g., an amount of fluid delivered, rate or timing of a fluid delivery (or a sequence of fluid deliveries), etc. In many cases, a valve (or combination of valves) may be utilized in such fluid control processes.

BRIEF DESCRIPTION OF THE DRAWINGS

The present disclosure, in accordance with one or more various examples, is described in detail with reference to the following figures. The figures are provided for purposes of illustration only and merely depict examples.

FIG. 5 illustrates a flowchart for an example fluid control process, in accordance with various examples of the presently disclosed technology.

Figure 1:
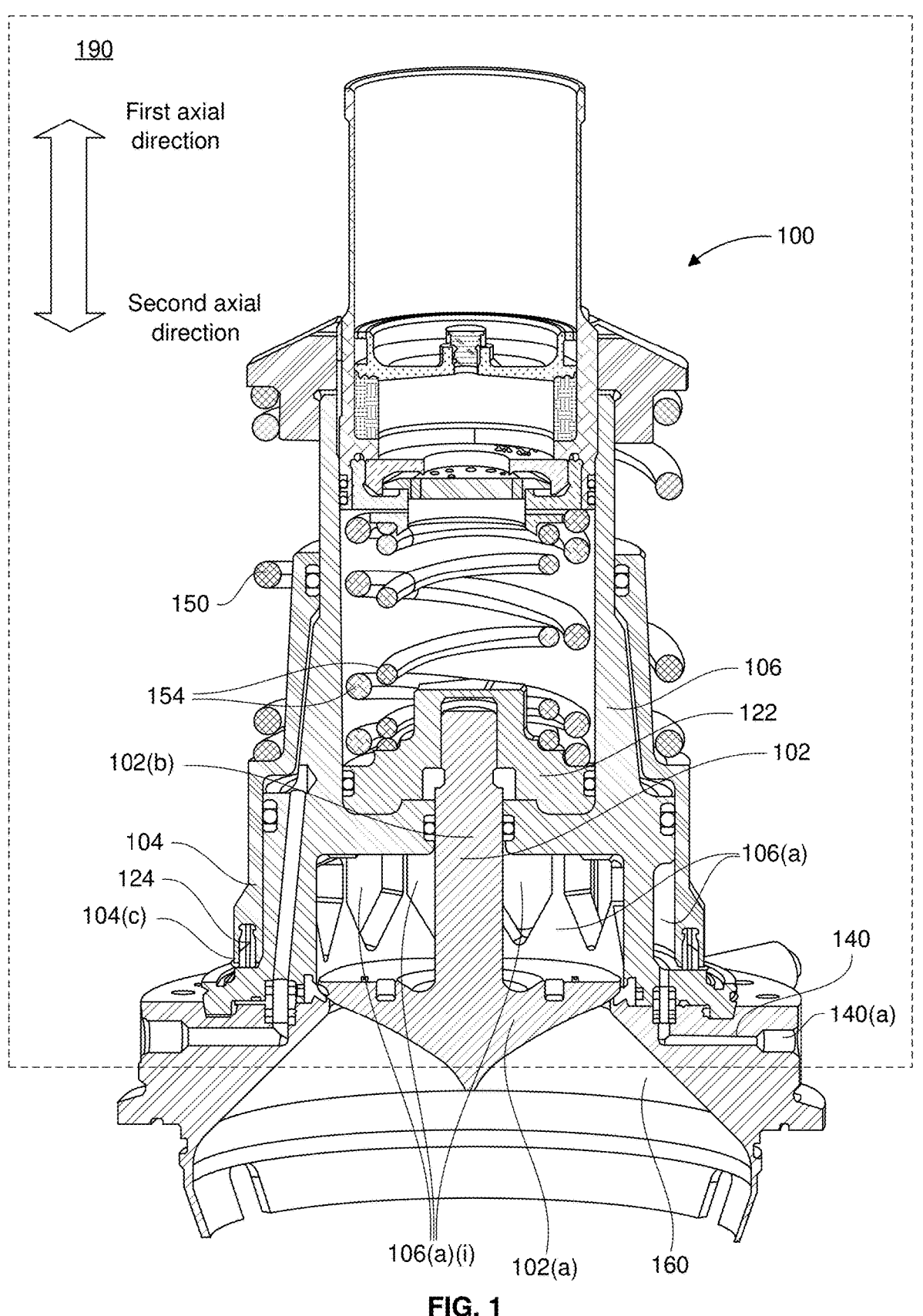
FIG. 1 illustrates a cross sectional view of a valve system, in accordance with various examples of the presently disclosed technology.

The figures are not exhaustive and do not limit the present disclosure to the precise form disclosed.

DETAILED DESCRIPTION

As stated above, certain machines may improve operational safety, machine life, or a combination of the two, through precise fluid flow control. For example, machines may implement processes which precisely control, e.g., an amount of fluid delivered, rate or timing of a fluid delivery (or a sequence of fluid deliveries), etc. In many cases, a valve (or combination of valves) may be utilized in such fluid control processes. However, defects which cause valves to operate differently than intended can compromise these fluid control processes.

For example, operational safety for a spacecraft may be improved by using a valve (or combination of valves) to precisely control the flow of propellant from a tank to a rocket motor prior to and during an ignition process. For instance, the spacecraft may utilize the valve(s) to precisely control, e.g., the amount of propellant permitted to flow to the rocket motor, rate and timing of a propellant delivery (or sequence of propellant deliveries) to the rocket motor, etc. However, a defect in the valve(s) which gate fluid flow between the tank and rocket motor can compromise these fluid control processes.

For example, immediately prior to implementing an ignition process, some fluid control processes may require a complete (or nearly complete) absence of propellant in a combustion chamber that supplies propellant to the rocket motor during the ignition process. Accordingly, a spacecraft may include a valve designed to block fluid from entering the combustion chamber prior to the ignition process. However, if there is a defect in the valve (or valve seal) which permits propellant to enter/leak into the combustion chamber prior to the ignition process, safety for the ignition process may be compromised.

Against this backdrop, examples of the presently disclosed technology provide valve systems and methods with enhanced reliability. The disclosed systems and methods facilitate a compact, multi-valve design that can improve safety and lifespan for machines that implement them. Moreover, the systems and methods can be utilized in various types of machines, including spacecraft, aircraft, and other machines which rely on precise fluid control for improved safety or machine life.

For example, a valve system of the presently disclosed technology may comprise a primary valve and a secondary valve incorporated into a single valve housing. Namely, the secondary valve may be positioned concentrically outside the valve housing while a valve seat of the primary valve is positioned concentrically within a cavity of the valve housing. Accordingly, actuating the secondary valve into an open position may at least partially uncover one or more apertures in the valve housing, thus opening a fluid connection between the cavity and a chamber the valve housing is immersed in. Moreover, when the primary valve is in a closed position and the secondary valve is in the open position, a first axial direction-facing surface (e.g., an upwards-facing surface) of the valve seat may be positioned in a second axial direction from (e.g., below) the one or more apertures, thus blocking a fluid connection between the chamber/cavity and a fluid routing structure positioned in the second axial direction from (e.g., below) the valve seat. Actuating the primary valve from the closed position to an open position may comprise translating the valve seat in the first axial direction (e.g., upwards) until a second axial direction-facing surface (e.g., a downwards-facing surface) of the valve seat is positioned in the first axial direction from (e.g., above) at least a portion of the one or more apertures between the chamber and cavity. Accordingly, with both the secondary valve and the primary valve in their respected open positions, fluid may flow from the chamber into the fluid routing structure.

As may be appreciated, the valve system may only open the fluid connection between the chamber and the fluid routing structure when both the primary and secondary valves are in an open position. Such redundancy decreases the likelihood of fluid leaking from the chamber into the fluid routing structure, and enables various fluid control processes for a machine which incorporates the above-described valve system. Such fluid control processes can improve operational safety and lifespan for machines which implement them.

For example, in certain implementations the above-described valve system may be used to gate the flow of propellant from a tank to a rocket motor in a spacecraft. Accordingly, the above-described chamber may comprise a tank of propellant, and the above-described fluid routing structure may comprise a combustion chamber that supplies propellant to the rocket motor during an ignition process. As alluded to above, some fluid control processes may require a complete (or nearly complete) absence of propellant in the combustion chamber immediately prior to the ignition procedure. Accordingly, the valve system may be used to: (1) decrease the likelihood that propellant enters the combustion chamber prior to the ignition process (e.g., through redundant valves); and (2) safely test for the presence of propellant in the combustion chamber immediately prior to initiating the ignition process.

For instance, an example fluid control process for the spacecraft may involve actuating the secondary valve into an open position to allow propellant to flow into the cavity of the valve housing through the one or more apertures in the valve housing. With the primary valve remaining in the closed position, a fluid connection between the cavity/propellant tank and combustion chamber should remain blocked. Notwithstanding, to account for/detect potential leaks past the valve seat of the primary valve, the fluid control process may involve detecting the presence of propellant in the combustion chamber after a pre-determined time interval has passed from opening the secondary valve (with the primary valve still in the closed position). For example, in certain implementations the fluid control process may utilize a temperature sensor in the combustion chamber to detect cooling caused by the presence of propellant in the combustion chamber. If no propellant is detected in the combustion chamber after the pre-determined time interval, the fluid control process may involve a controlled opening of the primary valve to allow propellant to flow (in a controlled manner) from the propellant tank, through the one or more apertures in the valve housing, and into the combustion chamber.

Here, the valve system may comprise various structural features to control the rate at which the primary valve is opened—thus providing additional levers for precise fluid control.

For example, the valve system may comprise a primary valve actuation cavity within the valve housing. Relatedly, the primary valve may further comprise a valve stem extending in the first axial direction (e.g., upwards) away from a first axial-direction facing surface (e.g., upwards-facing surface) of the valve seat. Here, the valve stem may extend (e.g., upwards) through the primary valve actuation cavity. Accordingly, the primary valve actuation cavity may be bounded radially between a portion of the valve stem and a portion of an inner wall of the valve housing. The primary actuation cavity may be bounded in the second axial direction (e.g., at bottom) by a second portion of the inner wall of the valve housing. Relatedly, the primary actuation cavity may be bounded in the first axial direction (e.g., at top) by a second axial direction-facing surface (e.g., downwards-facing surface) of a piston. The piston may be mechanically connected to a first axial direction-facing end (e.g., upwards-facing end) of the valve stem. Thus, actuating the primary valve from the closed position to the open position may comprise flowing fluid into the primary valve actuation cavity such that pressure of the fluid pushes the piston in the first axial direction (e.g., upwards), thus causing the primary valve to translate in the first axial direction (e.g., upwards). Here, tuning flow rate for the fluid introduced into the primary valve actuation cavity (e.g., using hydraulic/pneumatic actuators) can be one lever for controlling the rate at which the primary valve is opened.

The valve system may comprise additional structural features which further facilitate smooth/controlled opening of the primary valve. For example, in certain implementations the valve system may further comprise: (1) an actuation control cavity positioned in the first axial direction from (e.g., above) the piston within the valve housing; (2) a bellows positioned in the first axial direction from (e.g., above) the actuation control cavity within the valve housing; and (3) a plate separating the actuation control cavity from the bellows. Here, the plate may comprise an orifice permitting a fluid connection between the actuation control cavity and the bellows.

In various implementations, the above-described actuation control cavity may be bounded in the second axial direction (e.g., at bottom) by a first axial direction-facing surface (e.g., upwards-facing surface) of the piston. Relatedly, the actuation control cavity may be bounded in the first axial direction (e.g., at top) by a second axial direction-facing surface (e.g., downwards-facing surface) of the plate. Accordingly, translation of the piston in the first axial direction (e.g., upwards) may push fluid in the actuation control cavity through the orifice of the plate into the bellows causing the bellows to expand. Here, expansion of the bellows may resist translation of the piston and primary valve in the first axial direction (e.g., upwards), thus slowing/controlling opening for the primary valve.

In certain implementations, in addition to, or in lieu of the actuation control cavity and bellows, the valve system may comprise a spring mechanically connected to the piston. Here, compression of the spring may likewise resist translation of the piston and primary valve in the first axial direction (e.g., upwards), thus slowing/controlling opening for the primary valve. Axial forces imposed by the spring may also help ensure that the primary valve remains closed when not actuated.

The valve system may also comprise structural features to control the rate at which the secondary valve is opened—thus providing even further levers for precise fluid control.

For example, the valve system may further comprise a secondary valve actuation cavity within the valve housing. Accordingly, the secondary valve actuation cavity may be bounded radially between a portion of an outer wall of the valve housing and a portion of an inner wall of the secondary valve. Relatedly, the secondary valve actuation cavity may be bounded in the second axial direction (e.g., at bottom) by a second portion of the outer wall of the housing, and in the first axial direction (e.g., at top) by a second portion of the inner wall of the secondary valve. Thus, actuating the secondary valve from the closed position to the open position may comprise flowing fluid into the secondary valve actuation cavity such that pressure of the fluid pushes the second portion of the inner wall of the secondary valve in the first axial direction to cause the secondary valve to translate in the first axial direction (e.g., upwards). Here, tuning flow rate of the fluid introduced into the secondary valve actuation cavity (e.g., using hydraulic/pneumatic actuators) can be one lever for controlling the rate at which the secondary valve is opened.

In certain implementations, the valve system may also comprise a spring mechanically connected to an outer wall of the secondary valve. Here, compression of the spring may likewise resist translation of the secondary valve in the first axial direction (e.g., upwards), thus slowing/controlling opening for the secondary valve. Axial forces imposed by the spring may also help ensure that the secondary valve remains closed when not actuated.

In some implementations, the valve housing may comprise additional structural features to facilitate equalizing pressure between the cavity of the valve housing and the chamber prior to opening the secondary valve. For example, the valve system may further comprise a passage through the valve housing (separate from the one or more apertures) which permits a second (e.g., smaller/smaller diameter) fluid connection between the chamber and the cavity. The valve system may also comprise a third valve (e.g., a solenoid-actuated valve), where the third valve blocks the passage/second fluid connection between the chamber and the cavity when the third valve is in a closed position. The valve system may also comprise one or more sensors to detect pressure in the chamber and pressure in the cavity respectively. Leveraging such features, a fluid control process may involve, prior to opening the secondary valve, actuating the third valve into an open position to open the second fluid connection between the chamber and the cavity until the one or more sensors detect the pressure in the chamber and the pressure in the cavity are within a threshold differential. At this point, the fluid control process may involve closing the third valve (and thus closing the second fluid connection between the chamber and the cavity) and opening the secondary valve to open a fluid connection between the chamber and cavity through the one or more apertures in the valve housing.

Here, equalizing pressure between the cavity and chamber prior to opening the secondary valve can prevent (or otherwise reduce the likelihood of) a slamming/knocking effect when the secondary valve is opened. In other words, equalizing pressure between the cavity and chamber prior to opening the secondary valve can help avoid or prevent a water hammer effect in the cavity after the secondary valve is opened.

It should be understood that the presently disclosed systems and methods provide advantages over potential alternative designs which also leverage multi-valve systems for improved reliability/redundancy. For instance, by incorporating the primary valve, the secondary valve, and their associated actuation cavities/features in the same valve housing, examples may facilitate more compact designs (e.g., with smaller form factors, fewer moving parts, etc.) than potential alternatives. Similarly, by incorporating multiple structural features for controlling the opening/close rates of the primary and secondary valves, examples may provide more levers for controlling fluid in a precise manner than potential alternatives.

Examples of the presently disclosed technology are described in greater detail in conjunction with the following FIGs.

FIG. 1 illustrates a first cross sectional view of a valve system 100, in accordance with various examples of the presently disclosed technology. In the configuration depicted in FIG. 1, both a primary valve 102 and a secondary valve 104 of valve system 100 are in their respective closed positions.

Figure 2:
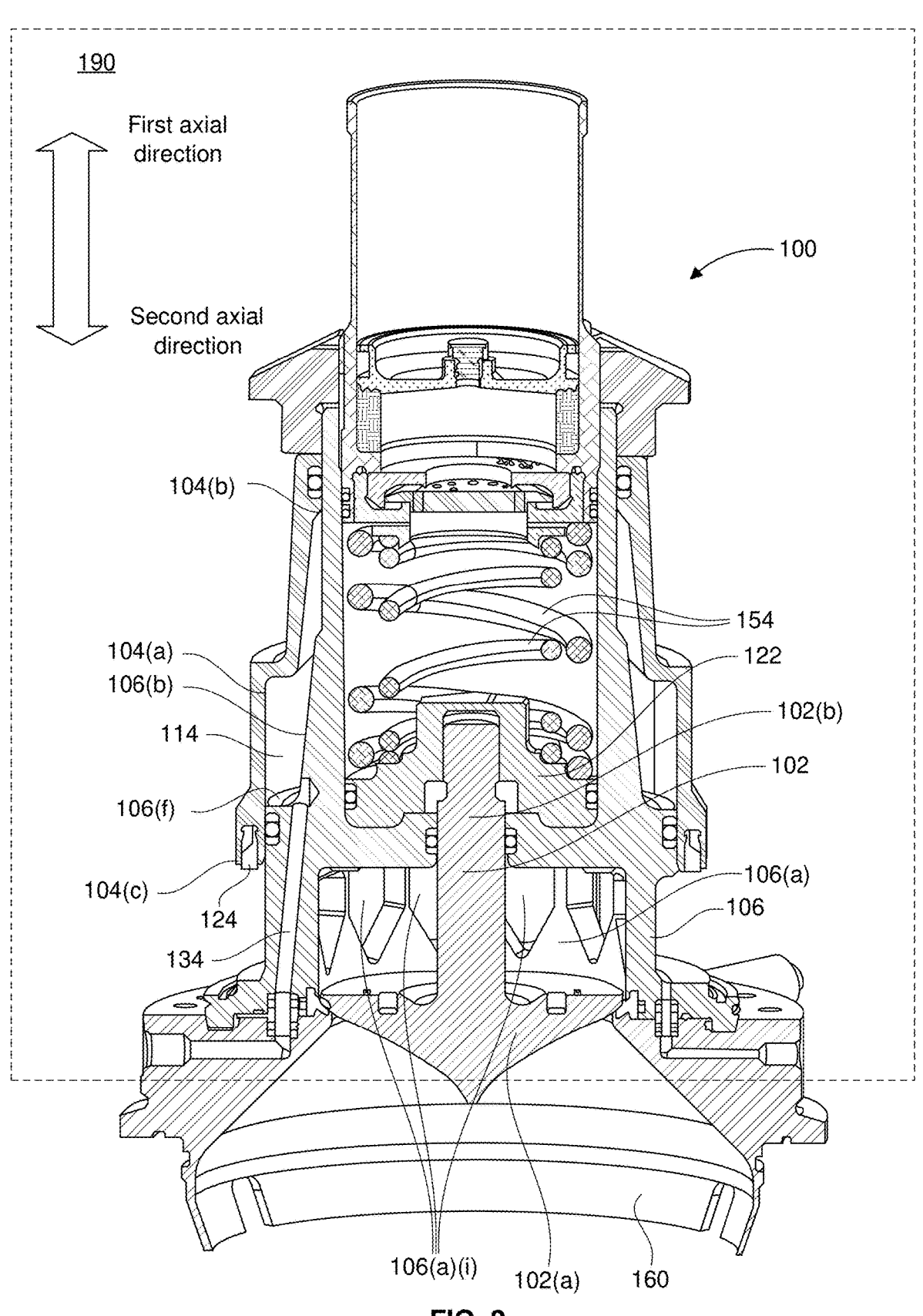
FIG. 2 illustrates another cross sectional view of a valve system, in accordance with various examples of the presently disclosed technology.

FIG. 2 illustrates a second cross sectional view of valve system 100, in accordance with various examples of the presently disclosed technology. In the configuration depicted in FIG. 2, primary valve 102 is in its closed position while secondary valve 104 is in its open position.

Figure 3:
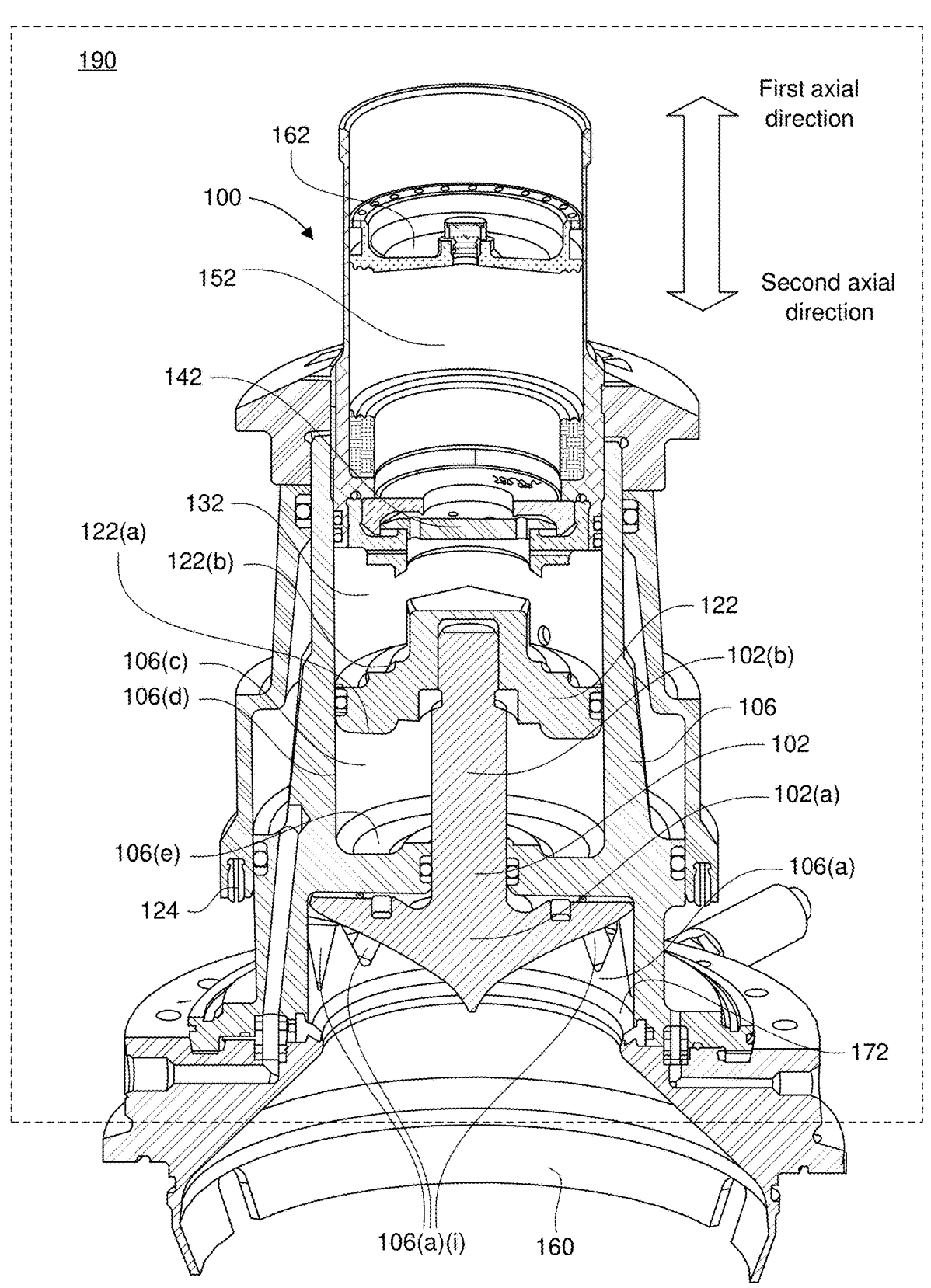
FIG. 3 illustrates another cross sectional view of a valve system, in accordance with various examples of the presently disclosed technology.

FIG. 3 illustrates a third cross sectional view of valve system 100, in accordance with various examples of the presently disclosed technology. In the configuration depicted in FIG. 3, both primary valve 102 and secondary valve 104 are in their respective open positions. Thus (and as described in greater detail below), valve system 100 may open/permit a fluid connection between a chamber 190 (which a valve housing 106 of valve system 100 is immersed in) and a fluid routing structure 160.

Before describing FIGS. 1-3 in more detail, it should be understood that certain shared structural features of valve system 100 depicted across all three FIGs. may only be enumerated in one or two of the FIGs. For example, certain structural features related to actuating secondary valve 104 are only enumerated in FIG. 2. Likewise, certain structures features related to actuating primary valve 102 are only enumerated in FIG. 3. Such a numeration scheme is used for brevity and ease of viewing. However, it should be appreciated that like features across FIGS. 1-3 may share a common numeration, even if not enumerated in all three FIGs.

Also, while the following description refers to a "first axial direction" and a "second axial direction" for generality, it may be appreciated that in FIGS. 1-3 the first axial direction corresponds with upwards/top/above, while the second axial direction corresponds with downwards/bottom/below.

Referring now to FIGS. 1-3 in more detail, as depicted valve system 100 may comprise a valve housing 106. Valve housing 106 may be immersed in a chamber 190. Here, chamber 190 may comprise a chamber of fluid, such as a tank or reservoir.

As depicted, valve system 100 may also comprise a primary valve 102 and a secondary valve 104.

As described above, valve system 100 may incorporate both primary valve 102 and secondary valve 104 into (a single) valve housing 106. Namely, secondary valve 104 may be positioned concentrically outside valve housing 106 while a valve seat 102(a) of primary valve 102 is positioned concentrically within a cavity 106(a) of valve housing 106.

As depicted in FIG. 1, when secondary valve 104 is in a closed position, secondary valve 104 may cover one or more apertures 106(a) (i) in valve housing 106, thus blocking a fluid connection between chamber 190 and cavity 106(a). As depicted, valve system 100 may also comprise a seal 124 recessed into a second axial direction-facing end 104(c) of secondary valve 104. Accordingly, when secondary valve 104 is in the closed position, seal 124 may provide a fluid-tight (or close to fluid-tight) seal between the second axial direction-facing end 104(c) of secondary valve 104 and a first axial direction-facing surface of valve housing 106.

As depicted in FIG. 2 (and as described in greater detail below), actuating secondary valve 104 into an open position may at least partially uncover one or more apertures 106(a) (i), thus opening a fluid connection between chamber 190 and cavity 106(a).

Moreover (and as depicted in FIG. 2), when primary valve 102 is in a closed position and secondary valve 104 is in the open position, a first axial direction-facing surface of valve seat 102(a) may be positioned in a second axial direction from one or more apertures 106(a)(i), thus blocking a fluid connection between chamber 190/cavity 106(a) and fluid routing structure 160 as fluid routing structure 160 is positioned in the second axial direction from valve seat 102(a). As depicted in FIG. 3, valve system 100 may further comprise a seal 172 (e.g., a ring seal) at a second axial direction-facing end of valve housing 106. As depicted, seal 172 may recess slightly inwards into the diameter of cavity 106(a). Accordingly, when primary valve 102 is in the closed position, seal 172 may provide a fluid-tight (or close to fluid-tight) seal between valve seat 102(a) and the second axial direction-facing end of valve housing 106—thus blocking a fluid connection between cavity 106(a) and fluid routing structure 160.

As depicted in FIG. 3, actuating primary valve 102 from the closed position to an open position may comprise translating valve seat 102(a) in the first axial direction until a second axial direction-facing surface of valve seat 102(a) is positioned in the first axial direction from at least a portion of one or more apertures 106(a)(i). Accordingly, with both secondary valve 104 and primary valve 102 in their respected open positions, fluid may flow from chamber 190, through one or more apertures 106(*a*)(*i*), and into fluid routing structure 160.

As depicted in FIG. 1, in certain implementations valve housing 106 may comprise additional structural features to facilitate equalizing pressure between cavity 106(*a*) and chamber 190 prior to opening secondary valve 104. For example, valve system 100 may further comprise a passage 140 through valve housing 106 which permits a second (e.g., smaller/smaller diameter) fluid connection between chamber 190 and cavity 106(*a*). Valve system 100 may also comprise a valve 140(*a*) (e.g., a solenoid valve). Here, valve 140(*a*) can block the fluid connection through passage 140 when valve 140(*a*) is in a closed position. Valve system 100 may also comprise one or more sensors (not depicted) to detect pressure in chamber 190 and pressure in cavity 106(*a*) respectively. Leveraging such features, a fluid control process may involve, prior to opening secondary valve 104, actuating valve 140(*a*) into an open position to open the fluid connection through passage 140 until the one or more sensors detect the pressure in chamber 190 and the pressure in cavity 106(*a*) are within a threshold differential. At this point, the fluid control process may involve closing valve 140(*a*)—and thus closing the fluid connection through passage 140. The fluid control process may then involve opening secondary valve 104 to open a fluid connection between chamber 190 and cavity 106(*a*) through one or more apertures 106(*a*)(*i*).

As described above, equalizing pressure between cavity 106(*a*) and chamber 190 prior to opening secondary valve 104 can prevent (or otherwise reduce the likelihood of) a slamming/knocking effect when secondary valve 104 is opened. In other words, equalizing pressure between cavity 106(*a*) and chamber 190 prior to opening secondary valve 104 can help avoid or prevent a water hammer effect in cavity 106(*a*) after secondary valve 104 is opened.

Referring now to FIG. 2 and actuating secondary valve 104 into the open position, valve system 100 may further comprise a secondary valve actuation cavity 114 within valve housing 106. As depicted, secondary valve actuation cavity 114 may be bounded radially between a portion 106(*b*) of an outer wall of valve housing 106 and a portion 104(*a*) of an inner wall of secondary valve 104. Relatedly, secondary valve actuation cavity 114 may be bounded in the second axial direction by a second portion 106(*f*) of the outer wall of valve housing 106, and in the first axial direction by a second portion 104(*b*) of the inner wall of secondary valve 104. Thus, actuating secondary valve 104 from the closed position to the open position may comprise flowing fluid into secondary valve actuation cavity 114 such that pressure of the fluid pushes the second portion 104(*b*) of the inner wall of secondary valve 104 in the first axial direction to cause secondary valve 104 to translate in the first axial direction. Here, tuning flow rate of the fluid introduced into secondary valve actuation cavity 114 (e.g., using hydraulic/pneumatic actuators) can be one lever for controlling the rate at which secondary valve 104 is opened. As depicted, in certain implementations a passage 134 through valve housing 106 may route fluid (e.g., hydraulic or pneumatic fluid) into secondary valve actuation cavity 114.

As depicted in FIG. 1, in certain implementations valve system 100 may comprise a spring 150 mechanically connected to an outer wall of secondary valve 104. Here, compression of spring 150 may resist axial translation of secondary valve 104 in the first axial direction. Accordingly, spring 150 may help control/slow the opening of secondary valve 102. Likewise, forces in the second axial direction imposed by spring 150 on secondary valve 104 may keep secondary valve 104 in the closed position (when desired).

Referring now to FIG. 3 and actuating primary valve 102 into the open position, valve system 100 may further comprise a primary valve actuation cavity 106(*c*) within valve housing 106. Relatedly, primary valve 102 may further comprise a valve stem 102(*b*) extending in the first axial direction away from a first axial-direction facing surface of valve seat 102(*a*). As depicted, valve stem 102(*b*) may extend through primary valve actuation cavity 106(*c*). Accordingly, primary valve actuation cavity 106(*c*) may be bounded radially between a portion of valve stem 102(*b*) and a portion 106(*d*) of an inner wall of valve housing 106. Primary actuation cavity 106(*c*) may be bounded in the second axial direction by a second portion 106(*e*) of the inner wall of valve housing 106. Relatedly, primary actuation cavity 106(*c*) may be bounded in the first axial direction by a second axial direction-facing surface 122(*a*) of a piston 122. As depicted, piston 122 may be mechanically connected to a first axial direction-facing end of valve stem 102(*b*). Thus, actuating primary valve 102 from the closed position to the open position may comprise flowing fluid into primary valve actuation cavity 106(*c*) such that pressure of the fluid pushes piston 122 in the first axial direction, thus causing primary valve 102 to translate in the first axial direction. Here, tuning flow rate of the fluid introduced into primary valve actuation cavity 106(*c*) (e.g., using hydraulic/pneumatic actuators) can be one lever for controlling the rate at which primary valve 102 is opened. While not depicted directly, fluid (e.g., hydraulic or pneumatic fluid) may be supplied to primary valve actuation cavity 106(*c*) via a passage similar to passage 134 highlighted in FIG. 2.

As depicted in FIG. 3, valve system 100 may comprise additional structural features which further facilitate smooth/controlled opening of primary valve 102. For example, in certain implementations valve system 100 may further comprise: (1) an actuation control cavity 132 positioned in the first axial direction from piston 122 within valve housing 106; (2) a bellows 152 positioned in the first axial direction from actuation control cavity 132 within valve housing 106; and (3) a plate 142 separating actuation control cavity 132 from bellows 152. Here, plate 142 may comprise an orifice permitting a fluid connection between actuation control cavity 132 and bellows 152. As depicted, in certain implementations one or more additional brackets may hold plate 142 in a fixed axial position within valve housing 106.

As depicted, actuation control cavity 132 may be bounded in the second axial direction by a first axial direction-facing 122(*b*) surface of piston 122. Relatedly, actuation control cavity 132 may be bounded in the first axial direction by a second axial direction-facing surface of plate 142. Accordingly, translation of piston 122 in the first axial direction may push fluid in actuation control cavity 132 through the orifice of plate 142 into bellows 152, causing bellows 152 to expand. Here, expansion of bellows 152 may resist translation of piston 122 and primary valve 102 in the first axial direction, thus slowing/controlling opening for primary valve 102. In certain implementations, a plate 162 may bound bellows 152 in the first axial direction. Accordingly, in such implementation translation of plate 162 in the first axial direction may allow bellows 152 to expand. However, in other implementations bellows 152 may be allowed to expand via other means.

As depicted in FIGS. 1 and 2, in addition to, or in lieu of actuation control cavity 132 and bellows 152, valve system 100 may comprise one or more springs 154 mechanically connected to piston 122. Accordingly, compression of one or more springs 154 may resist axial translation of piston 122 and primary valve 102 in the first axial direction. Accordingly, one or more springs 154 may help control/slow the opening of primary valve 102. Likewise, forces in the second axial direction imposed by one or more springs 154 may help keep primary valve 102 in the closed position (when desired).

Figure 4:
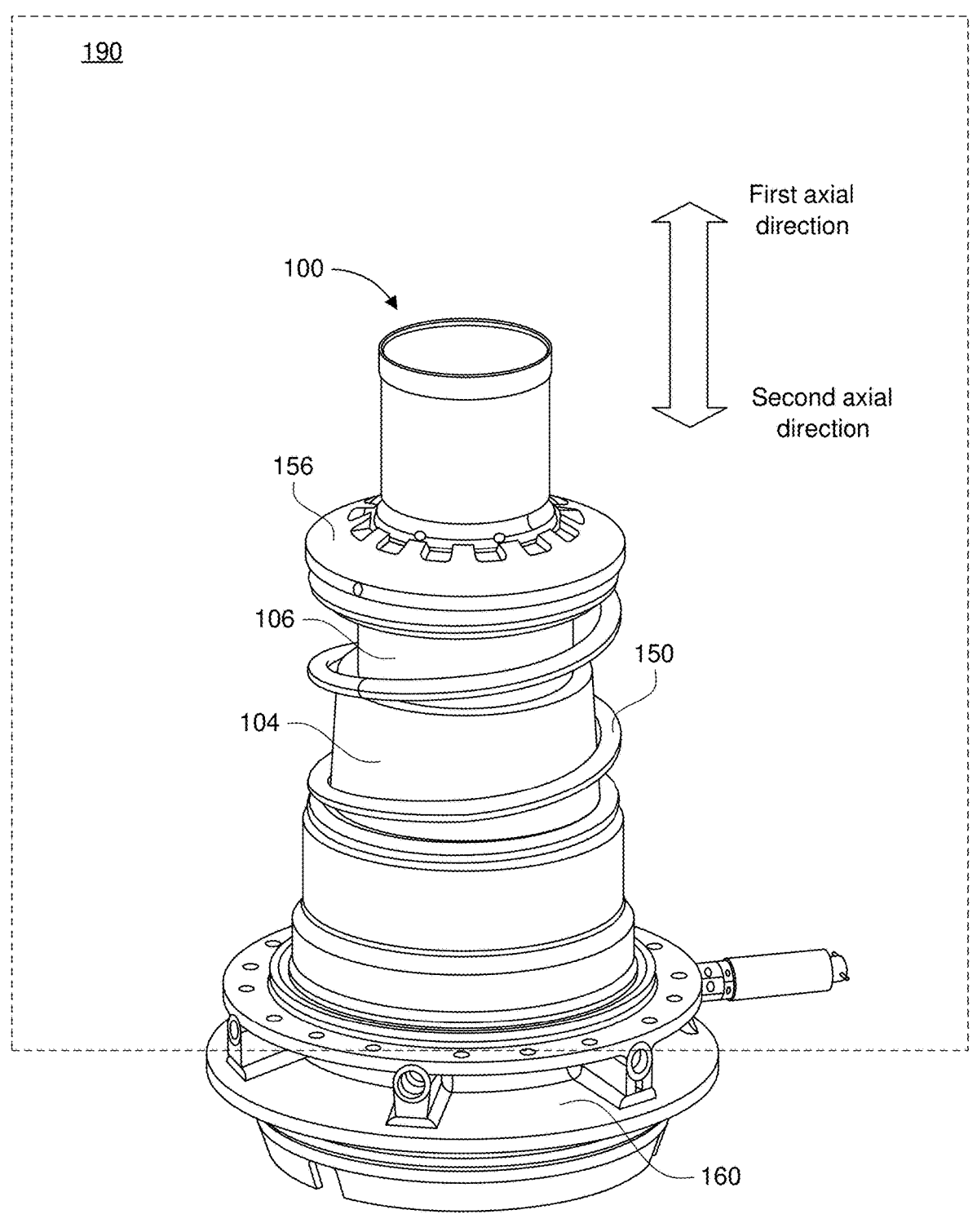
FIG. 4 illustrates a perspective view of a valve system, in accordance with various examples of the presently disclosed technology.

FIG. 4 illustrates a perspective view of valve system 100, in accordance with various examples of the presently disclosed technology.

In the configuration depicted in FIG. 4, secondary valve 104 is in the closed position. Accordingly, secondary valve 104 covers one or more apertures 106(a)(i) in valve housing 106 (not depicted in FIG. 4 as they are covered). Because primary valve 102 is positioned within cavity 106(a) of valve housing 106 and secondary valve 104 is covering one or more apertures 106(a)(i) opening into cavity 106(a), primary valve 102 cannot be seen in the perspective view of FIG. 4.

As depicted and described in conjunction with FIG. 1, in certain implementations valve system 100 may comprise a spring 150 mechanically connected to a first axial direction-facing surface of secondary valve 104. For example, a second axial direction facing end of spring 150 may be mechanically connected to the first axial direction-facing surface of secondary valve 104. Relatedly, a first axial direction-facing end of spring 150 may be mechanically connected to a flange 156. Flange 156 may be part of valve system 100, and may be positioned concentrically around valve housing 106. Flange 156 may maintain a fixed axial position with respect to valve housing 106. Accordingly, compression of spring 150 between secondary valve 104 and flange 156 may resist translation of secondary valve 104 in the first axial direction.

FIG. 5 illustrates an example fluid control process 500, in accordance with various examples of the presently disclosed technology.

In certain implementations, the operations of fluid control process 500 may be performed by a fluid control circuit. In other implementations, the operations of fluid control process 500 may be manually controlled. In various implementations, some operations of fluid control process 500 may be performed by a fluid control circuit, and other operations of fluid control process 500 may be manually controlled.

As depicted, operation 502 may comprise, actuating a first valve of a valve system into an open position. Here, actuating the first valve of into the open position may permit fluid to flow from a chamber, through a fluid routing passage, and into a cavity of a housing of the valve system. The housing may be positioned within the chamber.

As depicted, operation 504 may comprise, responsive to detecting pressure within the cavity is within a threshold difference of pressure in the chamber, actuating a second valve of the valve system into an open position. Here, actuating the second valve into the open position may permit additional fluid to flow from the chamber, through one or more apertures in the housing, and into the cavity. For example, actuating the secondary valve into the open position may at least partially uncover the one or more apertures, thus permitting the additional fluid to flow from the chamber into the cavity, through the one or more apertures.

In some implementations, flow rate of the additional fluid flowing through the one or more apertures may be greater than flow rate of the fluid flowing through the fluid routing passage.

In certain implementations, fluid control process 500 may further comprise, responsive to detecting the pressure within the cavity is within the threshold difference of the pressure in the chamber, actuating the first valve into a closed position to block fluid from flowing through the fluid routing passage.

As depicted, operation 506 may comprise, responsive to detecting less than a threshold amount of fluid has flowed from the cavity, past a third valve of the valve system, and into a fluid routing structure, actuating the third valve into an open position. Here, actuating the third valve into the open position may permit fluid to flow from the chamber into the fluid routing structure.

In various examples, the valve system used for fluid control process 500 may comprise valve system 100. Similarly, the chamber from fluid control process 500 may comprise chamber 190.

Accordingly, in these implementations the first valve may comprise valve 140(a). Likewise, the fluid routing passage may comprise passage 140.

Here, the housing may comprise valve housing 106, the cavity may comprise cavity 106(a), and the one or more apertures may comprise one or more apertures 106(a)(i).

The second valve may comprise secondary valve 104, and the third valve may comprise primary valve 102.

As used herein, the term module or circuit may be used describe a given unit of functionality that can be performed in accordance with one or more embodiments of the present application. As used herein, a module might be implemented utilizing any form of hardware, software, or a combination thereof. For example, one or more processors, controllers, ASICs, PLAS, PALs, CPLDs, FPGAs, logical components, software routines or other mechanisms might be implemented to make up a module. Various components described herein may be implemented as discrete module or described functions and features can be shared in part or in total among one or more modules. In other words, as would be apparent to one of ordinary skill in the art after reading this description, the various features and functionality described herein may be implemented in any given application. They can be implemented in one or more separate or shared modules in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where modules are implemented in whole or in part using software, these software elements can be implemented to operate with a computing or processing component capable of carrying out the functionality described with respect thereto. A processor or controller of a module might include, for example, one or more processors, controllers, control components, or other processing devices. Processors might be implemented using a general-purpose or special-purpose processing engine such as, for example, a microprocessor, controller, or other control logic. The modules might also include one or more memory components.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A valve system comprising:
a housing comprising one or more apertures to permit a fluid connection between a chamber the housing is positioned within and a cavity of the housing;
a secondary valve positioned concentrically outside the housing, wherein:
   when the secondary valve is in a closed position the secondary valve covers the one or more apertures to block the fluid connection between the chamber and the cavity, and
   actuating the secondary valve into an open position at least partially uncovers the one or more apertures, thus opening the fluid connection between the chamber and the cavity; and
a primary valve comprising a valve seat, wherein:
   the valve seat is positioned concentrically within the cavity, and
   when the primary valve is in a closed position and the secondary valve is in the open position, a first axial direction-facing surface of the valve seat is positioned in a second axial direction from the one or more apertures, thus blocking a fluid connection between the chamber and a fluid routing structure positioned in the second axial direction from the valve seat.

2. The valve system of claim 1, wherein actuating the primary valve from the closed position to an open position comprises translating the valve seat in the first axial direction until a second axial direction-facing surface of the valve seat is positioned in the first axial direction from at least a portion of the one or more apertures.

3. The valve system of claim 2, wherein actuating the secondary valve and the primary valve into their respective open positions opens the fluid connection between the chamber and the fluid routing structure.

4. The valve system of claim 1, wherein:
actuating the secondary valve from the closed position to the open position comprises translating the secondary valve in the first axial direction until a second axial direction-facing end of the secondary valve is positioned in the first axial direction from at least a portion of the one or more apertures.

5. The valve system of claim 4, further comprising a spring mechanically connected to an outer wall of the secondary valve, wherein compression of the spring resists translation of the secondary valve in the first axial direction.

6. The valve system of claim 4, further comprising a secondary valve actuation cavity, wherein:
the secondary valve actuation cavity is bounded radially between a portion of an outer wall of the housing and a portion of an inner wall of the secondary valve;
the secondary valve actuation cavity is bounded in the second axial direction by a second portion of the outer wall of the housing;
the secondary valve actuation cavity is bounded in the first axial direction by a second portion of the inner wall of the secondary valve; and
actuating the secondary valve from the closed position to the open position comprises flowing fluid into the secondary valve actuation cavity such that pressure of the fluid pushes the second portion of the inner wall of the secondary valve in the first axial direction to cause the secondary valve to translate in the first axial direction.

7. The valve system of claim 2, further comprising a primary valve actuation cavity, wherein:
the primary valve further comprises a valve stem extending in the first axial direction away from a first axial-direction facing surface of the valve seat;
the valve stem extends through the primary valve actuation cavity;
the primary valve actuation cavity is bounded radially between a portion of the valve stem and a portion of an inner wall of the housing;
the primary valve actuation cavity is bounded in the second axial direction by a second portion of the inner wall of the housing;
the primary valve actuation cavity is bounded in the first axial direction by a second axial direction-facing surface of a piston, the piston mechanically connected to a first axial direction-facing end of the valve stem; and
actuating the primary valve from the closed position to the open position comprises flowing fluid into the primary valve actuation cavity such that pressure of the fluid pushes the piston in the first axial direction, thus causing the primary valve to translate in the first axial direction.

8. The valve system of claim 7, further comprising:

an actuation control cavity positioned in the first axial direction from the piston;

a bellows positioned in the first axial direction from the actuation control cavity; and a plate separating the actuation control cavity from the bellows, wherein the plate comprises an orifice permitting a fluid connection between the actuation control cavity and the bellows.

9. The valve system of claim 8, wherein:

the actuation control cavity is bounded in the second axial direction by a first axial direction-facing surface of the piston;

the actuation control cavity is bounded in the first axial direction by a second axial direction-facing surface of the plate;

translation of the piston in the first axial direction pushes fluid in the actuation control cavity through the orifice of the plate into the bellows causing the bellows to expand; and expansion of the bellows resists translation of the piston and primary valve in the first axial direction.

10. The valve system of claim 1, further comprising:

a passage permitting a second fluid connection between the chamber and the cavity;

a third valve, wherein the third valve blocks the second fluid connection between the chamber and the cavity when the third valve is in a closed position; and one or more sensors configured to detect pressure in the chamber and pressure in the cavity respectively;

wherein, when the secondary valve is in the closed position, actuating the third valve into an open position opens the second fluid connection between the chamber and the cavity until the one or more sensors detect the pressure in the chamber and the pressure in the cavity are within a threshold differential.

11. The valve system of claim 1, wherein:

the chamber comprises a tank of propellant; and the fluid routing structure positioned in the second axial direction from the valve seat provides a fluid connection to a combustion motor.

12. A valve system comprising:

a housing comprising one or more apertures to permit a fluid connection between a chamber the housing is positioned within and a cavity of the housing;

a secondary valve positioned concentrically outside the housing, wherein:

when the secondary valve is in a closed position the secondary valve covers the one or more apertures to block the fluid connection between the chamber and the cavity, and actuating the secondary valve into an open position at least partially uncovers the one or more apertures, thus opening the fluid connection between the chamber and the cavity; and a primary valve comprising a valve seat, wherein:

the valve seat is positioned concentrically within the cavity, when the primary valve is in a closed position and the secondary valve is in the open position, a first axial direction-facing surface of the valve seat is positioned in a second axial direction from the one or more apertures, thus blocking a fluid connection between the chamber and a fluid routing structure positioned in the second axial direction from the valve seat, and actuating the primary valve from the closed position to an open position comprises translating the valve seat in the first axial direction until a second axial direction-facing surface of the valve seat is positioned in the first axial direction from at least a portion of the one or more apertures, thus opening the fluid connection between the chamber and the fluid routing structure.

13. The valve system of claim 12, wherein actuating the secondary valve from the closed position to the open position comprises translating the secondary valve in the first axial direction until a second axial direction-facing end of the secondary valve is positioned in the first axial direction from at least a portion of the one or more apertures.

14. The valve system of claim 13, further comprising a secondary valve actuation cavity, wherein:

the secondary valve actuation cavity is bounded radially between a portion of an outer wall of the housing and a portion of an inner wall of the secondary valve;

the secondary valve actuation cavity is bounded in the second axial direction by a second portion of the outer wall of the housing;

the secondary valve actuation cavity is bounded in the first axial direction by a second portion of the inner wall of the secondary valve; and actuating the secondary valve from the closed position to the open position comprises flowing fluid into the secondary valve actuation cavity such that pressure of the fluid pushes the second portion of the inner wall of the secondary valve in the first axial direction to cause the secondary valve to translate in the first axial direction.

15. The valve system of claim 12, further comprising a primary valve actuation cavity, wherein:

the primary valve further comprises a valve stem extending in the first axial direction away from a first axial-direction facing surface of the valve seat;

the valve stem extends through the primary valve actuation cavity;

the primary valve actuation cavity is bounded radially between a portion of the valve stem and a portion of an inner wall of the housing;

the primary valve actuation cavity is bounded in the second axial direction by a second portion of the inner wall of the housing;

the primary valve actuation cavity is bounded in the first axial direction by a second axial direction-facing surface of a piston, the piston mechanically connected to a first axial direction-facing end of the valve stem; and actuating the primary valve from the closed position to the open position comprises flowing fluid into the primary valve actuation cavity such that pressure of the fluid pushes the piston in the first axial direction, thus causing the primary valve to translate in the first axial direction.

* * * * *